United States Patent [19]

Kobinata

[11] Patent Number: 4,796,800
[45] Date of Patent: Jan. 10, 1989

[54] STRIP TAPE FOR A FOOD PRODUCT PACKAGING CONTAINER

[75] Inventor: Motochika Kobinata, Gotenba, Japan

[73] Assignee: AB Tetra Pak, Lund, Sweden

[21] Appl. No.: 125,199

[22] Filed: Nov. 25, 1987

[30] Foreign Application Priority Data

Dec. 16, 1986 [JP] Japan ................................ 61-301111

[51] Int. Cl.$^4$ .............................................. B65D 3/10
[52] U.S. Cl. ................................... 229/5.7; 229/3.1; 229/48 R; 220/75
[58] Field of Search .................. 229/3.1, 5.7, 48 R, 229/48 SA; 383/107, 108; 220/75, 80

[56] References Cited

U.S. PATENT DOCUMENTS

| | | | |
|---|---|---|---|
| 2,775,395 | 12/1956 | Bergstrom | 229/3.1 |
| 3,314,591 | 4/1967 | Cheeley | 383/107 |
| 3,687,351 | 8/1972 | Kaercher et al. | 229/3.1 |
| 3,695,971 | 10/1972 | Corning, Jr. | 229/3.1 |
| 4,363,841 | 12/1982 | Snow | 383/108 |
| 4,525,396 | 6/1985 | Takasa et al. | 229/3.1 |

FOREIGN PATENT DOCUMENTS 951341  3/1964  United Kingdom ................ 229/3.1

*Primary Examiner*—David T. Fidei
*Attorney, Agent, or Firm*—Koda and Androlia

[57] ABSTRACT

A strip tape for a food product packaging container covering the inner side of a seam of the container formed of paper-based ply material blanks so as to improve a barrier feature on the same area. The tape includes a plurality of layers and at least one layer is a metal layer. The side edges of the metal layer arranged in a lengthwise direction of the tape remain interiorly so as not to reach the right and left sides of tape, so that the metal layer does not come into contact with the content of the container when attached on the seamed area of the container.

4 Claims, 2 Drawing Sheets

STRIP TAPE FOR A FOOD PRODUCT PACKAGING CONTAINER

BACKGROUND OF THE INVENTION

1. Field of the Invention

The present invention relates to a tape attached on the inner side of the seam of a food product packaging container made of paper-based ply material blanks an improvement in the barrier feature in the seam area.

2. Prior Art

It is known that there is a food product packaging container for liquid food such as milk, juice, or the like, which is airtight by sealing off the top and bottom open ends of a tube-shaped ply material made of paper-based ply board blank by folding and overlapping the lengthwise end portions for welding to form a seam.

In such an airtight packaging container having a seam B as shown in FIG. 4, the lengthwise end surface a of the ply material A' is exposed along the seam B. It is recognized that the exposed ply material may not satisfy the requirement of food sanitation laws which prohibit the contents of the container from coming into direct contact with any substance except for polyethylene, by generally overlapping and welding the lengthwise end portion of the play material A'.

In the prior art, a tape strip S covering the inner side of the seam B as shown in FIG. 4 exists (for example, that disclosed in Japanese Patent Publication No. 56-14544).

The object of invention of the above-identified application is to protect a tape strip from deforming by heat. However, there is no explanation on a barrier protection against water, gases, and most seriously against oxygen and light. Accordingly, in whatever manner the tape strip S is attached to the inner side of the seam B, oxygen and other substances may enter into the airtight container A through the seam B. For example, although the container A is airtight, oxygen may enter it through a paper base layer 1 as indicated by the arrow in FIG. 4 and can move inwardly across the tape strip S eventually coming into direct contact with the food product in the container A.

Since the permeability of gases, including oxygen, is greater in the tape strip S than in the ply material A', gases entering from the seam B always pass through the tape strip S to finally come into direct contact with the contents of the container A. Consequently, when impurities enter the airtight container A, the food product in the container A deteriorates.

SUMMARY OF THE INVENTION

In order to accomplish the object of the present invention, the present invention provides a tape strip comprising a plurality of layers, the layers including at least a metal layer, and the side edges of the metal layer remain inside of the tape so that they do not reach the right or left ends of the tape strip arranged in a lengthwise direction. The metal layer is placed inside between the other layers so that it is not exposed externally on both the front and back sides and additionally not exposed with its lengthwise edges at the right and left ends of the tape arranged in a lengthwise direction.

Consequently, the tape strip contains at least the metal layer which features a barrier protection against water, oxygen, other gases or light, and is not on either the front or back sides of the tape strip nor at the right or left ends of the tape lengthwise.

BRIEF DESCRIPTION OF THE DRAWINGS

FIGS. 1-5 of the accompanying drawings illustrate one preferred embodiment of the present invention, wherein:

FIG. 1 is an enlarged plan view with an extending portion omitted;

FIG. 2 is an enlarged cross-sectional view of a tape strip taken along the line II—II of FIG. 1;

FIG. 3 is a perspective view showing a container with the tape strip applied thereon;

FIG. 4 is an enlarged cross-sectional view of a part of the tape strip applied on the container;

FIG. 5 is a plan view showing wide strip which includes a plurality of tape strips of FIG. 1 in communication with the right and left directions and also shown an extending portion thereof omitted.

DETAILED DESCRIPTION OF THE INVENTION

One embodiment of the present invention will be described in conjunction with the accompanying drawings.

Figure 1:
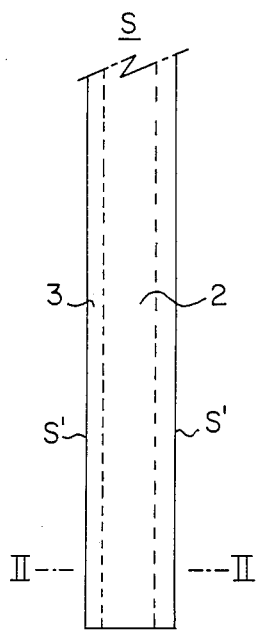
Figure 2:
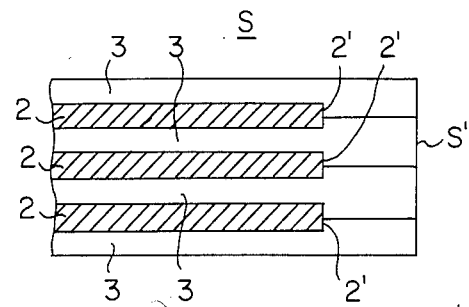

A tape strip S is a laminated strip having a plurality of layers as shown in FIG. 1 At least one layer 2 of the layers is made of metal such as aluminum, preferably, and other layers 3 are made of plastic, preferably, polyethylene. The metal layer 2, at least one included in the layers of the tape strip S, provides assured barrier protection against light, water, oxygen and other gases, by preventing such from entering the container.

The metal layer 2 should be positioned within the tape strip S so as to not be on the external side of the layers. Thus, both the front and back sides of the metal layer 2 are covered with respective layers 3. Therefore, the metal layer 2 is not exposed on the front or back sides of the tape strip S.

Figure 3:
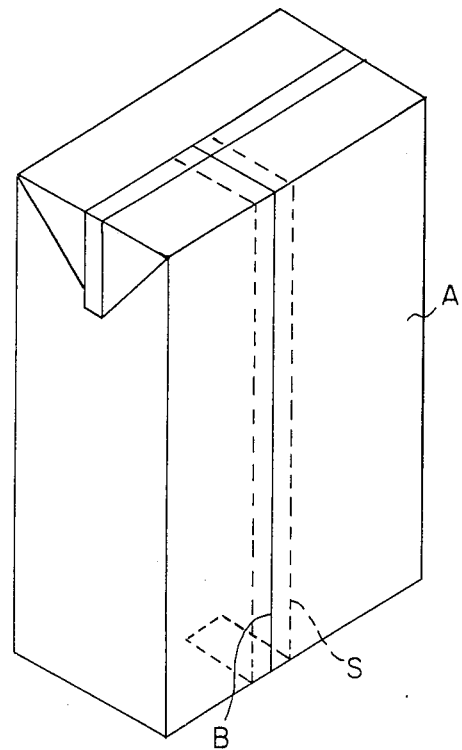
Figure 4:
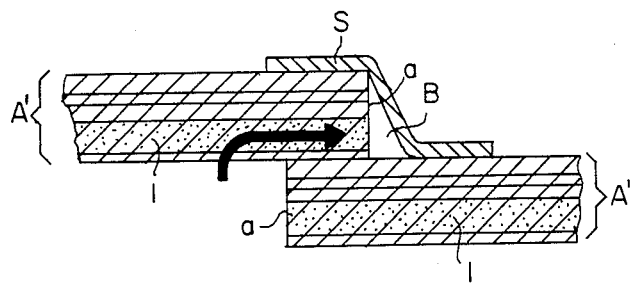
Figure 6:
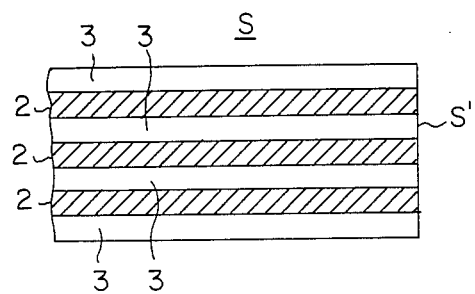
FIG. 6 is an enlarged cross-sectional view showing a comparison example in which the side edges of the metal layers which are disposed internally are exposed at the side end of a tape strip.

However, the side edges of the metal layer 2 is exposed at the right and left sides S' of the tape strip S arranged in a lengthwise direction as shown in FIG. 6 when the metal layer 2 is placed between the other layers of the tape strip S only. When this tape strip S is attached to the inner side of a seam B of a food product packaging container A formed of a paper-based ply material blank A' as shown in FIGS. 3 and 4, the side edges of the metal layer 2 come into direct contact with the food product in the container A. Thus, food sanitation requirements are not satisfied since it is prohibited for the contents of the container to come into contact with any substance except polyethylene.

The side edges S' of the metal layer 2 should be arranged to remain inside of the tape and should not reach the right or left side edges S' of the tape strip S arranged in a lengthwise direction. In this manner, the metal layer 2 is not exposed at the right or left edges S' of the tape strip S.

The metal layer 2 formed as at least a layer to improve the barrier protection against water, oxygen, other gases or light is not exposed externally either on the front or back side of the tape strip S nor at the right or left edge S' of the tape strip S is attached to the inner side of the same B of the container A formed from a paper-based ply material blank A' as shown in FIGS. 3 and 4. The metal layer 2 formed as a layer to improve the barrier protection does not come into direct contact with the food product in the container A.

Although it should be understood that to provide a single metal layer 2 in the tape strip S, the tape strip of this embodiment is made of three metal layers, each being disposed on every non-metal layer. The number of metal layers can be increased or reduced as desired. The metal layer 2 can be formed of metallic deposition or foil laminating. To form the metal layer 2 via metallic deposition, each layer is metallized entirely before removing unnecessary portions with solvent. A necessary portion of the layer may be metallized or an etching process may be employed.

Figure 5:
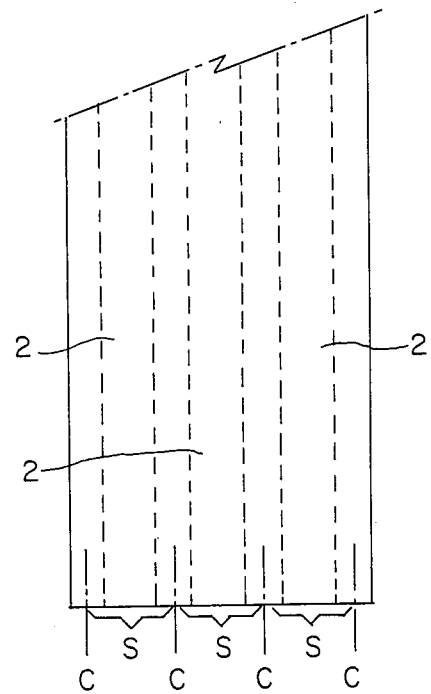

The tape strip S can be manufactured one at a time or a wide strip including a plurality of tape strips S communicating side by side in right and left directions can be formed as shown in FIG. 5. The thus communicated tape greatly improve the manufacturing efficiency and are separated afterward into pieces by cutting along cutting lines C arranged along the communicating zones.

The tape strip S in accordance with the present invention, which provides a barrier protection against water, oxygen, other gases and light, is attached to the inner side of the seam B of a food product packaging container formed of a paper-based ply material blank. The advantage of the tape is that the life of the food product in the container can be extended. Additionally, the metal layer 2 which is contained within the strip tape S improves its barrier protection against water, oxygen, other gases and light, and is not exposed either on the front or back side of the strip tape S nor at the right or left sides S' of the strip tape S arranged in a lengthwise direction. The thus improved strip tape S satisfies the conditions of the food sanitation laws which prohibit the contents of the container from coming into contact with any substance except polyethylene. Also, the tape does not have any disadvantages as sealing tape for food product packaging.

I claim:

1. A strip tape for a food product packaging container attached to the inner side of a seam of said food product packaging container formed of a paper-based ply material blank so as to improve a barrier feature on the seam area, said tape comprising a plurality of layers which include at least one metal layer, side edges of said metal layer being arranged in a lengthwise direction in the interior of the strip tape so as to not reach the right or left ends of said strip tape arranged in a lengthwise direction.

2. A strip tape for a food product packaging container, as defined in claim 1, wherein said metal layer is formed by metallic deposition.

3. A strip tape for a food product packaging container, as defined in claim 1, wherein said metal layer is formed by metal foil laminating.

4. A strip tape for a food product packaging container, as defined in claim 1, 2 or 3, wherein said metal is aluminum.

* * * * *